L. H. HOLT.
RIDING CULTIVATING MACHINE.
APPLICATION FILED JAN. 24, 1920.

1,354,556.

Patented Oct. 5, 1920.
2 SHEETS—SHEET 1.

Inventor
Louie H. Holt.

his Attorneys.

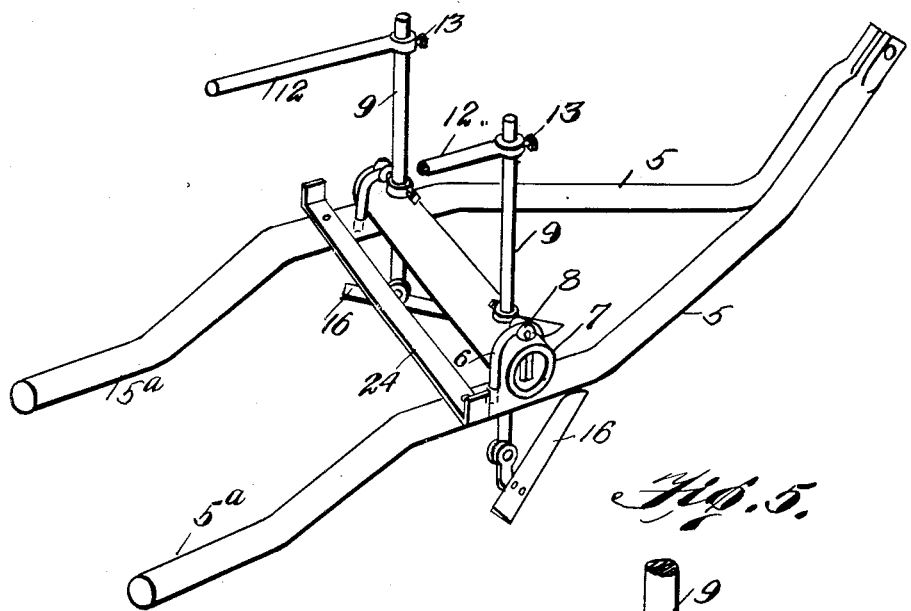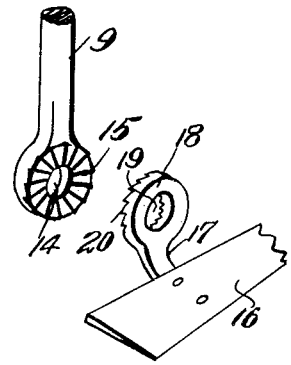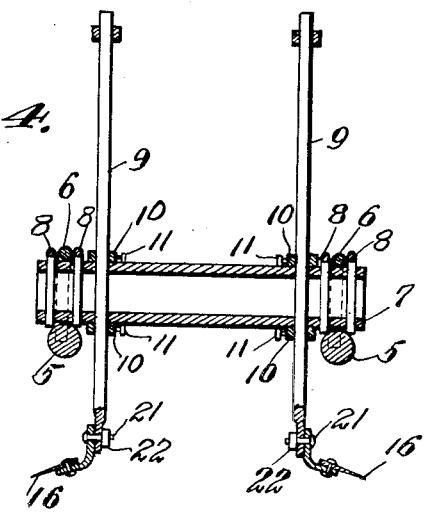

UNITED STATES PATENT OFFICE.

LOUIE H. HOLT, OF CARMEN, OKLAHOMA.

RIDING CULTIVATING-MACHINE.

1,354,556.  Specification of Letters Patent.  Patented Oct. 5, 1920.

Application filed January 24, 1920. Serial No. 353,906.

*To all whom it may concern:*

Be it known that I, LOUIE H. HOLT, citizen of the United States, residing at Carmen, in the county of Alfalfa and State of Oklahoma, have invented certain new and useful Improvements in Riding Cultivating-Machines, of which the following is a specification, reference being had therein to the accompanying drawings.

This invention relates to a riding cultivating machine, and more particularly to a weed, or weed-destroying apparatus.

The object of my invention is the construction of a simple and efficient machine which will enable the operator to cut or kill the weeds close to a plant, and, at the same time, cut or kill the weeds between plants, as the machine passes along the row.

With this and other objects in view my invention comprises certain other novel combinations, arrangements and constructions, as will be hereinafter specifically described, illustrated in the accompanying drawings, and more particularly pointed out in the appended claims.

In the drawings:

Figure 1 is a view in side elevation of the machine constructed in accordance with the present invention, while

Fig. 3 is a perspective view of the runners and the weed-cutting devices supported thereon.

Fig. 4 is a sectional view taken on line 4—4, Fig. 2.

Fig. 5 is a fragmentary perspective view of the lower end of one of the vertical shafts.

Fig. 6 is a fragmentary perspective view of one of the knife blades.

Figure 1:
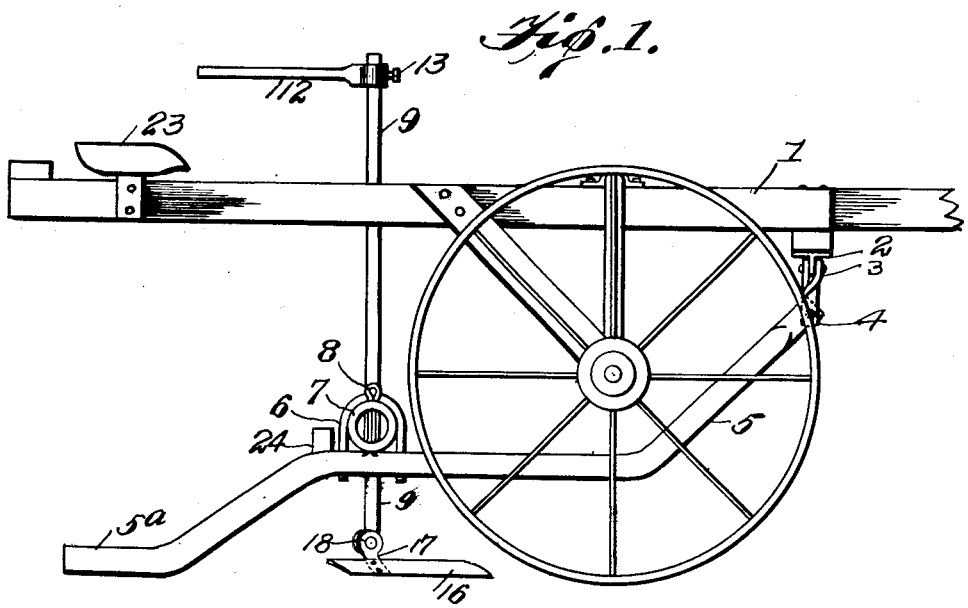
Figure 2:
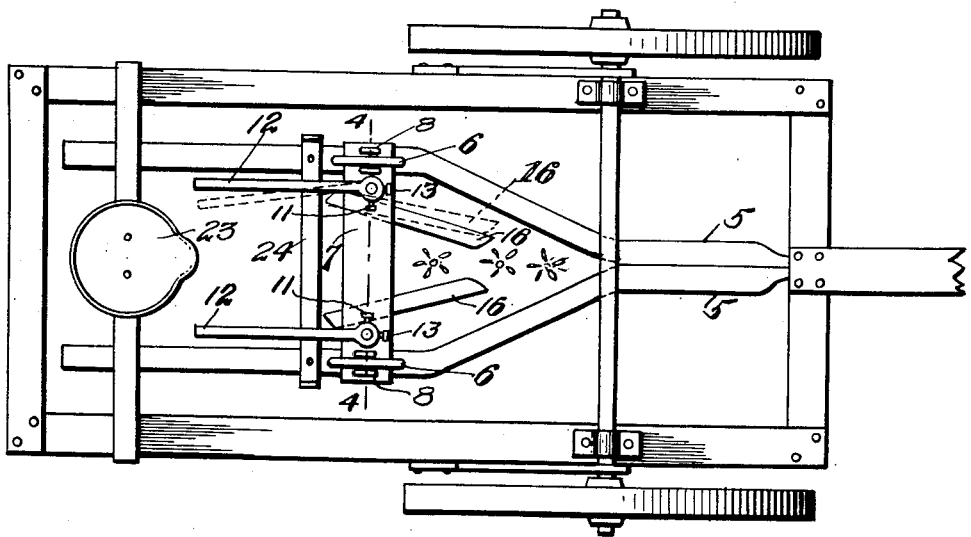
Fig. 2 is a top plan view of the same.

Referring to the drawings by numerals, 1 designates a frame having attached at its forward end a plate 2. A pair of links 3 are attached to plate 2, and to these links, at 4, are pivotally attached runners 5. These runners are secured together (Fig. 2) at their forward ends, and have their rear ends spaced apart, producing substantially a Y-shaped sled frame.

Near the middle of the runners are inverted U-shaped collars 6; each collar 6 has its ends fastened in a runner, by any suitable means, and within the U-shaped collars 6 is placed a tubular cross piece 7. To prevent the cross piece 7 from sliding off the runners, and to prevent it from accidentally being moved from under the collars 6, a pair of cotter pins 8 are extended through the tubular cross piece 7 contiguous to each collar 6; the cotter pins in each pair are placed at opposite sides of the collar 6, thereby constituting an efficient stop for preventing the cross piece from accidentally sliding under the collars.

Vertical shafts 9 extend through the tubular cross piece 7 (Fig. 4) and on each shaft 9, above and below the cross piece 7 are locking collars 10; these locking collars 10 are placed snugly against the cross piece 7 and are provided with screws 11. The locking collars 10 permit the shafts to be adjusted to suit the operator, in accommodating the machine to the particular ground over which the machine is to travel.

Handles 12 are adjustably secured upon the upper ends of the shafts 9 by means of set screws 13.

The lower end of each shaft 9 is provided with an aperture 14 and with a ratchet face 15. I use two knife blades 16 in constructing my apparatus, and each knife blade 16 is provided with an upstanding arm 17 which terminates in a head 18. An aperture 19 is formed in the head 18 and on the inner face of the head is a ratchet 20, which ratchet meshes with the ratchet 15 on the shaft 9, and by means of a bolt 21, together with nut 22 (Fig. 4) the knife blade 16 can be retained in an adjusted position upon the shaft 9. The operator can quickly adjust the knife to the desired inclination so as to cut weeds on a perfectly flat surface or may cut weeds on an inclined surface, such as on a slight hill, in cultivating such plants as sweet potatoes that are usually grown on hills.

A seat 23 is suitably placed on the frame 1 and the operator can rest his feet on rest 24. The rear ends 5ᵃ of the runners slide over the ground, and the weight of the sled frame constituted by said runners is sufficient to hold the knife blades 16 against the ground to cut weeds either close to the ground or, if desired, by adjusting the shafts slightly downward or by the operator pressing upon the foot rest 24, the knife blades will enter the ground slightly and cut the weeds below the surface. The front ends of the knives can be quickly adjusted by the operator gripping the handles 12 to cause the knife to miss plants but cut the weeds close thereto and at the same time cause the front ends of the knives to enter the row between the plants and thereby cut all of the weeds in the row. The operator can become skilful in manipulating the knives, first, causing the machine to travel slowly along the row until he becomes experienced in the operation of the knives.

While I have described the preferred embodiment of my invention and have illustrated the same in the accompanying drawing, certain minor alterations or changes may appear to one skilled in the art to which this invention relates, and, therefore, I reserve the right to make such alterations or changes in the extensive manufacture of my machine as shall fairly fall within the scope of the appended claims.

What I claim is:

1. In a machine of the class described, the combination with a frame, of runners attached to said frame, a tubular cross piece resting upon said runners, U-shaped inverted collars straddling the cross piece and having their ends fastened to the runners, and vertically and horizontally adjustable cutting means supported upon the tubular cross piece.

2. In a machine of the class described, the combination with a frame, of runners attached to said frame, a tubular cross piece resting upon said runners, inverted U-shaped collars straddling the cross piece and having their ends secured to the runners, a pair of cotter pins extending through the tubular cross piece at opposite sides of each U-shaped collar for holding the cross piece in place upon the runners, and adjustable cutting means carried by the tubular cross piece.

3. In a machine of the class described, the combination with a frame, of runners connected to said frame, a cross piece secured to said runners, shafts extending through said cross piece and slidably mounted thereon, means securing said shafts in an adjusted position upon the cross piece, and knife blades attached to the lower ends of the shafts.

4. In a machine of the class described, the combination with a frame, of runners attached to said frame, a tubular cross piece carried by said runners, vertical shafts extending through said cross piece, locking collars upon said shafts above and below and engaging the tubular cross piece, adjustable handles on the shafts above the cross piece, and knife blades attached to the lower ends of the shafts.

5. In a machine of the class described, the combination with a frame, of runners carried by said frame, a cross piece on said runners, a pair of shafts rotatably mounted upon said cross piece, each shaft provided at its lower end with an aperture and a ratchet, a knife blade provided with an upstanding arm terminating in an apertured head, said head provided with a ratchet adapted to mesh with the ratchet on the shaft, and detachable fastening means in the apertures of the shafts and the heads for securing the knife blades in an adjustable position upon the shafts.

In testimony whereof I hereunto affix my signature.

LOUIE H. HOLT.